March 15, 1966  J. D. HORGAN ET AL  3,240,074
GYROSCOPE THERMAL SHIELD
Filed April 12, 1961

INVENTORS.
James D. Horgan &
BY Thomas A. Nelson
Paul J. Ethington
ATTORNEY

United States Patent Office 3,240,074
Patented Mar. 15, 1966

3,240,074
GYROSCOPE THERMAL SHIELD
James D. Horgan, Elm Grove, and Thomas A. Nelson, Racine, Wis., assignors to General Motors Corporation, Detroit, Mich., a corporation of Delaware
Filed Apr. 12, 1961, Ser. No. 102,613
6 Claims. (Cl. 74—5)

This invention relates to an improved gyroscope structure and more particularly to a floated gyroscope having a thermal shield for preventing temperature gradients in the flotation liquid.

Conventionally, a floated gyroscope comprises a cylindrical float mounted to rotate about its longitudinal axis and contains the gyro rotor. The float is immersed in a liquid to relieve the mounting bearings of the weight of the float and also to provide a damping force on the float. The reason for reducing the load on the float bearings is to reduce friction, thereby making the float very sensitive to torques acting on the gyro rotor. The measurement of this torque by detecting rotary displacement of the float is the essence of the gyroscope and must be carried out with extreme accuracy. It is also conventional practice to include thermostatically controlled heaters within the gyro casing to keep the flotation liquid and other parts of the gyro at a constant temperature. It has been found, however, that despite this precaution, circumferential thermal gradients exist within the assembly which set up convection currents in the flotation liquid. These convection currents in turn produce a torque on the float which interferes with the accurate measurement of the torques acting on the gyro rotor. It has further been found that the thermal gradients in the assembly are caused by temperature differences on the outer surface of the casing which arise from variations in ambient temperatures. These variations may be due to external air currents or to heat sources adjacent the gyro, for example.

The object of this invention is to provide means to prevent thermal gradients on the surface of the gyro casing thereby eliminating convection currents in the flotation fluid.

The invention is carried out by enclosing the gyro in a shell having sufficiently good heat conduction that it will tend to maintain a uniform temperature through its entire surface, notwithstanding variations in ambient temperature and further to space the shell from the gyro casing to provide an insulating air gap all around the casing.

Figure 1:
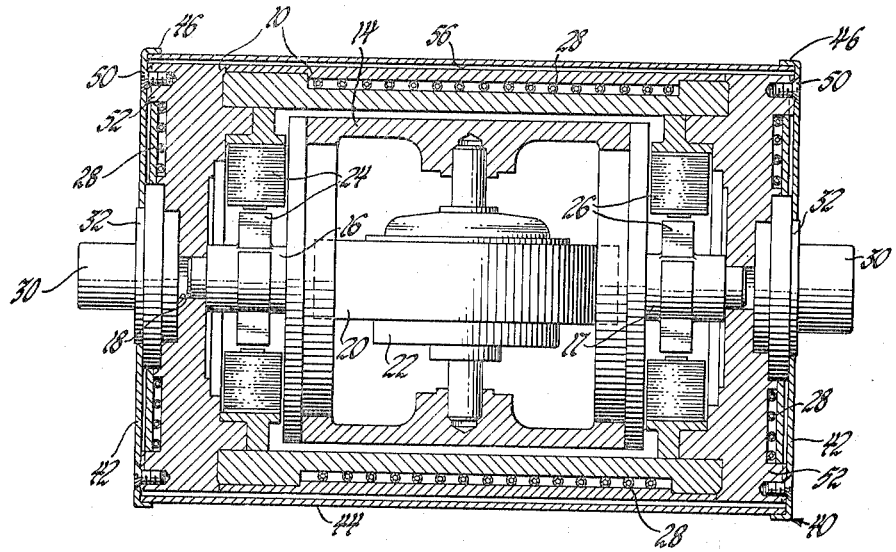
Figure 2:
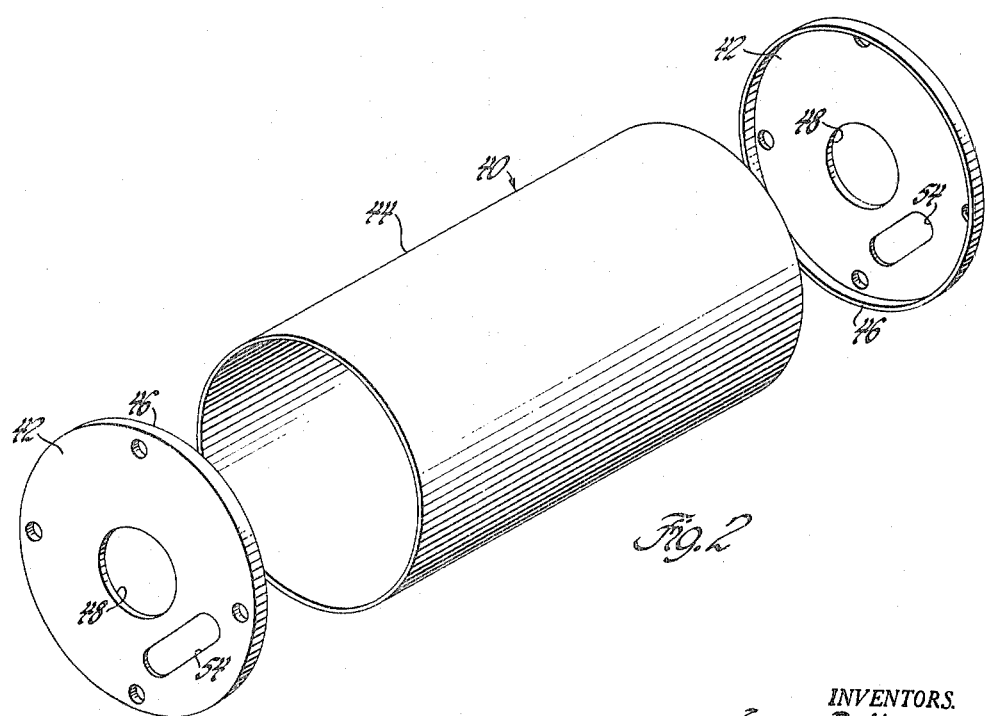

The above and other advantages of the invention will be made more apparent from the following specification taken in conjunction with the accompanying drawings in which:

FIGURE 1 is a partly broken away view of a gyroscope assembly surrounded by a thermal shield according to the invention, and FIGURE 2 is an exploded view of the thermal shield of FIGURE 1.

The gyroscope comprises an outer casing 10 which contains a fluid having sufficient density to buoy a float 14. The float is cylindrical in form and has a trunnion 16 or 17 extending from either end mounted in supporting bearings 18 so that the float 14 may rotate about its longitudinal axis. The float contains a gyro rotor 20 and stator means 22 for spinning the rotor 20. The electrical pickup devices 24 associated with one of the trunnions 16 of the float 14 and the casing 10 are arranged to detect a very small amount of rotation of the float 14 and a torque motor 26 associated with the other of the trunnions 17 will be energized by the output signal of the pickup devices 24 to counteract the said rotation so that the float 14 will remain near a null position. Thermostatically controlled heaters 28 within the casing 10 maintain the assembly at a constant temperature. The casing 10 also has trunnions 30 extending from both ends for supporting the gyro in an external holder, not shown. Each trunnion 30 has an annular shoulder thereon adjacent the casing 10.

The thermal shield 40 surrounding the gyro casing 10 comprises end plates 42 and a cylindrical shell 44. The end plates 42 are discs each having an inturned peripheral flange 46 and having a centrally located hole 48 adapted to seat on the trunnion shoulder 32, for concentrically locating the shield with respect to the casing 10. The end plate 42 may be either metal or a nonmetal and is secured by several screws 50 to bosses 52 on the ends of the outer casing 10. Apertures 54 in plates 42 admit electrical leads to the gyro. The cylindrical shell 44 extends between the end plates 42 and is supported by the flange 46 on the plates 42. The shell 44 must be made of a metal having high heat conductivity such as aluminum or copper. The shell 44 is spaced slightly from the casing 10 so that the resulting air gap 56 will be an insulator. However, the gap 56 is not large enough to permit convection currents to be set up.

It has been found that a cadmium plated copper shell 44 of about 0.04 inch thickness will serve to provide the requisite uniformity of temperature over the surface thereof. The cadmium plating will tend to reflect radiant energy to reduce the heating effects thereof. An air gap 56 of a few hundredths of an inch between the shell 44 and the casing 10 will provide insulation to retard heat flow from the shell to the casing and yet will not permit convection currents which would be apt to transfer heat nonuniformly between the shell and casing.

It is thus seen that the invention provides a means for eliminating circumferential thermal gradients within the gyro assembly by preventing unequal heating of the surface of the casing. The invention provides a shield of uniform temperature around the casing of the gyroscope and in addition provides an insulating air gap so that heat loss from the casing is not only small but is also uniform. It may readily be seen that another advantage of the proposed construction is to reduce heat losses of the gyro assembly, thereby reducing the amount of power required to heat the assembly.

The invention may be carried out by means other than the preferred embodiment described herein and the scope thereof is limited only by the following claims.

We claim:
1. A floated gyroscope having a casing, a thermal shield means surrounding said casing, said shield means comprising a shell of high heat conductivity and being closely spaced from said casing for providing a heat insulating air gap between said casing and shell to minimize heat transfer therebetween.

2. A floated gyroscope having a casing, a thermal shield surrounding said casing comprising a shell of high heat conductivity, and an air gap between said shell and said casing, said air gap being sufficiently small to inhibit convection currents therein.

3. A floated gyroscope having a cylindrical outer casing, trunnions extending axially from said casing, and a thermal shield around said casing comprising an end plate mounted on each trunnion and a cylindrical metallic shell around said casing extending between and supported by said end plates.

4. A gyroscope having a casing, a thermal shield around said casing comprising a pair of end plates secured to said casing, and a cylindrical metallic shell extending between said end plates, and a small air gap defined by said shell and casing.

5. A floated gyroscope having a cylindrical outer casing, trunnions extending axially from said casing, and a thermal shield around said casing comprising an end plate mounted on each trunnion and secured to the casing and a cylindrical shell around said casing extending between and supported by said end plates, said shell consisting of a copper sheet approximately .04 inch thick and having a highly reflective outer coating, said casing and shell defining an annular air space sufficiently small to prevent convection currents therein.

6. A gyroscope comprising a closed cylindrical casing, a gimbal assembly including a cylindrical float having trunnions supported by the casing for rotation about an output axis, a rotor shaft mounted within said float and extending transversely of said output axis, a rotor of magnetic material supported on said shaft for rotation about a spin reference axis, a stator supported by said float and disposed adjacent said rotor for imparting rotation thereto, a heater element within said casing for maintaining a substantially constant gyroscope temperature, a signal generator having a stator mounted on the casing and a rotor mounted on one of the trunnions, a torque motor having a stator mounted on the casing and a rotor mounted on the other of the trunnions, a viscous liquid filling said casing and providing buoyant support and viscous damping of the gimbal assembly, said gimbal assembly being subject to torques arising from circumferential convection currents in said liquid, said casing being subject to circumferential thermal gradients giving rise to said circumferential convection currents, and means to inhibit said thermal gradients comprising a thermal shield around said casing including flanged circular end plates secured to the ends of said cylindrical casing, a heat conductive cylindrical shell extending between and supported by said end plates, and a radiation reflective finish on said shell, said shield and said casing defining an air gap sufficiently small to inhibit convection currents within said air gap.

References Cited by the Examiner
UNITED STATES PATENTS

| | | | |
|---|---|---|---|
| 2,260,396 | 10/1941 | Otto | 74—5 X |
| 2,825,789 | 3/1958 | Scott | 74—5.6 X |
| 2,835,132 | 5/1958 | Vacquier | 74—5.47 |
| 2,929,250 | 3/1960 | Passarelli et al. | 74—5.6 |
| 2,930,240 | 3/1960 | Rellensmann et al. | 74—5 |
| 3,031,892 | 5/1962 | Krupick | 74—5.5 |

FOREIGN PATENTS 1,224,158  2/1960  France.

BROUGHTON G. DURHAM, *Primary Examiner.*